(12) United States Patent
Stolin et al.

(10) Patent No.: US 6,748,111 B1
(45) Date of Patent: Jun. 8, 2004

(54) RECOGNIZING TEXT IN A MULTICOLOR IMAGE

(75) Inventors: Jacob Y. Stolin, San Jose, CA (US); Shawn A. Gaither, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/454,180

(22) Filed: Dec. 2, 1999

(51) Int. Cl.⁷ .................................................. G06K 9/34
(52) U.S. Cl. ........................ 382/176; 382/165; 382/170
(58) Field of Search ................................. 382/162–164, 382/168–180; 358/452–466

(56) References Cited

U.S. PATENT DOCUMENTS

| | | | | |
|---|---|---|---|---|
| 5,280,367 A | * | 1/1994 | Zuniga | 358/462 |
| 5,375,197 A | * | 12/1994 | Kang | 358/462 |
| 5,900,953 A | * | 5/1999 | Bottou et al. | 382/176 |
| 6,148,102 A | * | 11/2000 | Stolin | 382/164 |

OTHER PUBLICATIONS

Victor Wu et al., "Finding Text In Images," Abstract, *University of Massachusetts*, 1997, Amherst, MA, pp. 1–14.

* cited by examiner

*Primary Examiner*—Jingge Wu
(74) *Attorney, Agent, or Firm*—Fish & Richardson P.C.

(57) ABSTRACT

A method and apparatus for identifying and reproducing a background of a pixelmap. The method includes dividing the pixelmap into a grid of tiles, determining for each tile a background component and building a representation of a background in the pixelmap using the determined background component for each tile.

23 Claims, 9 Drawing Sheets

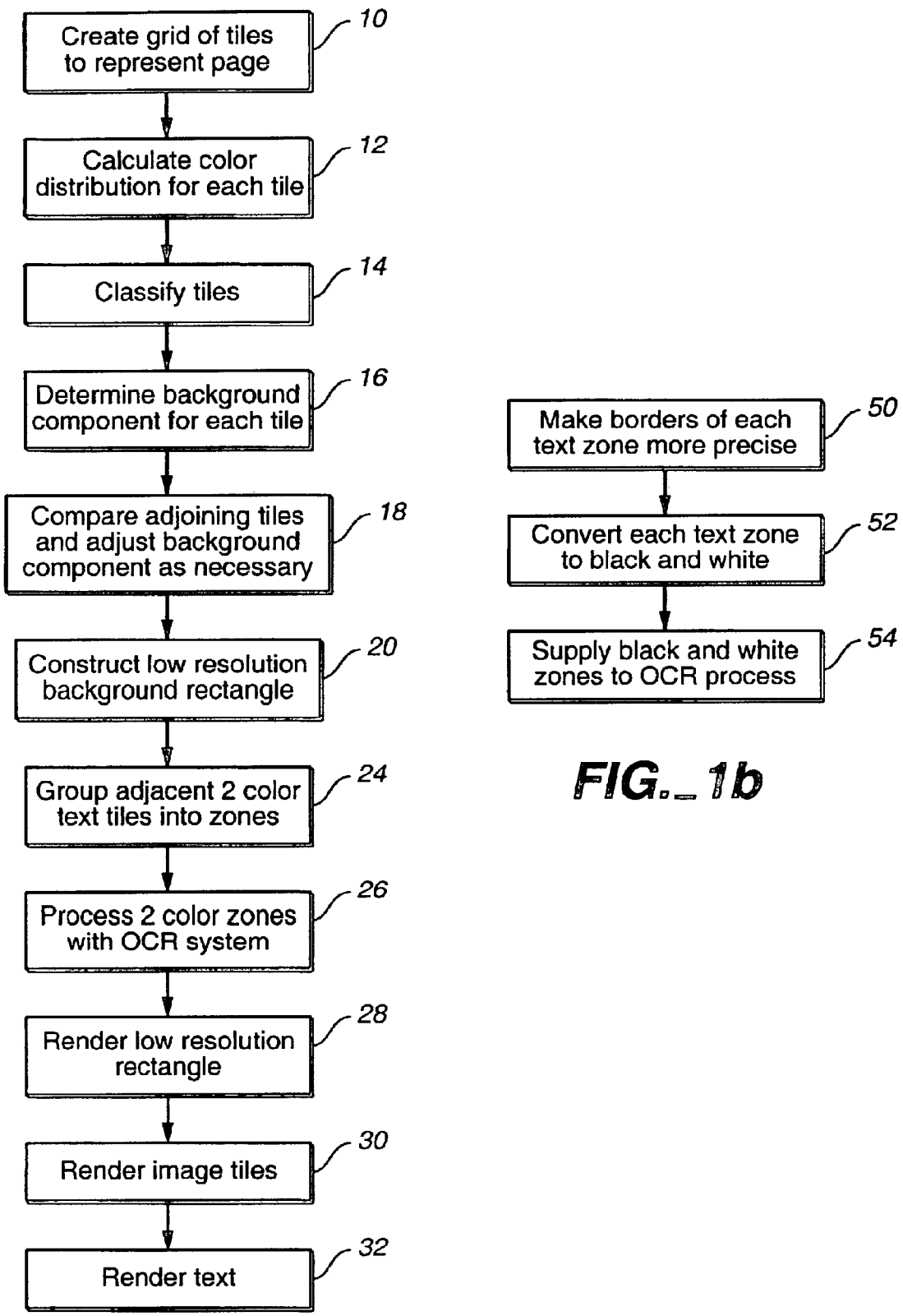

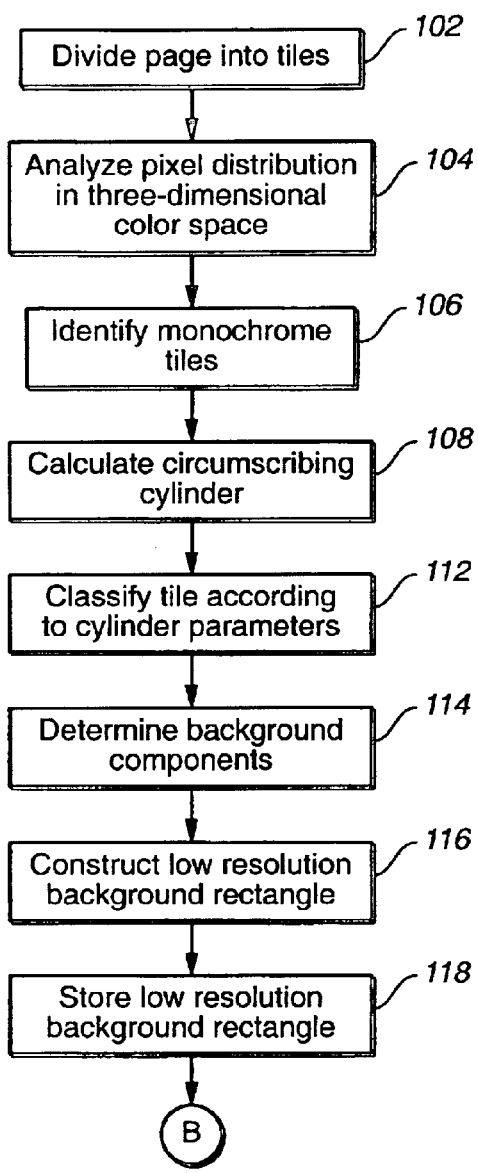
*FIG._2a*
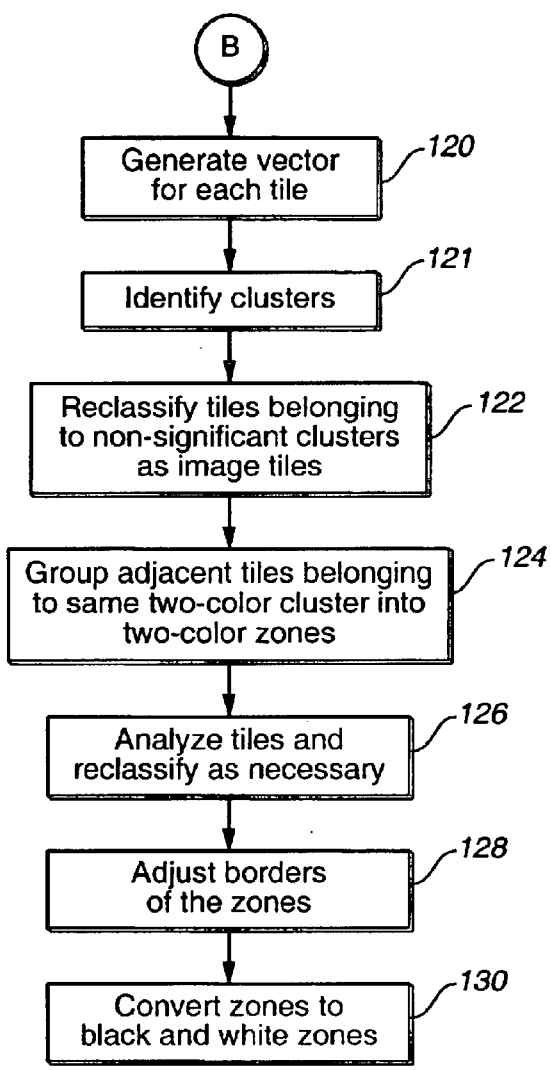
*FIG._2b*

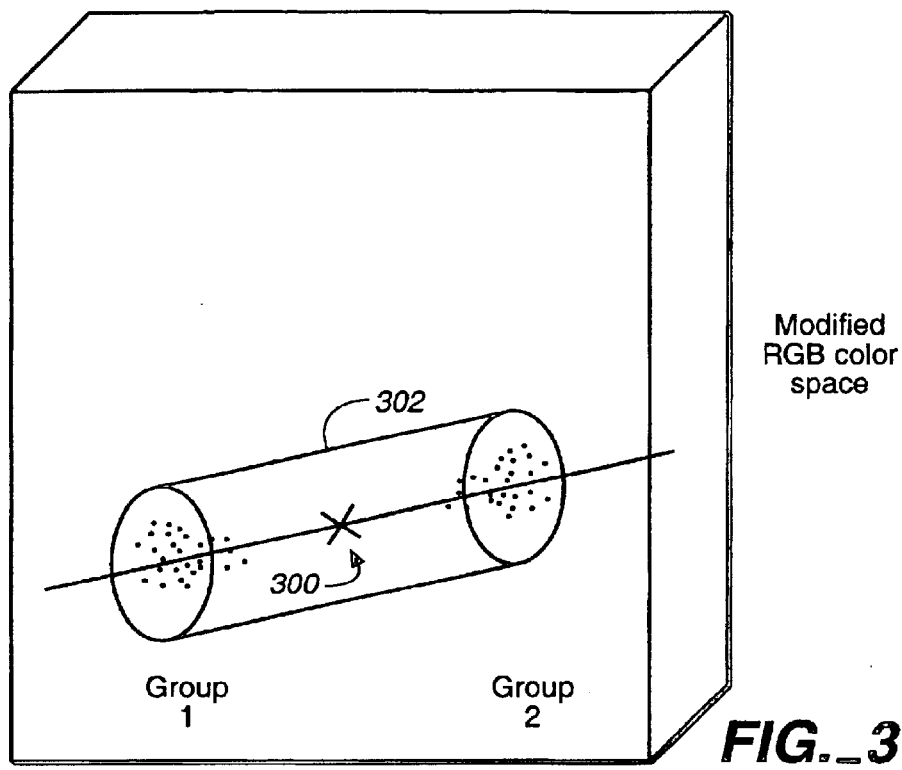
FIG._3
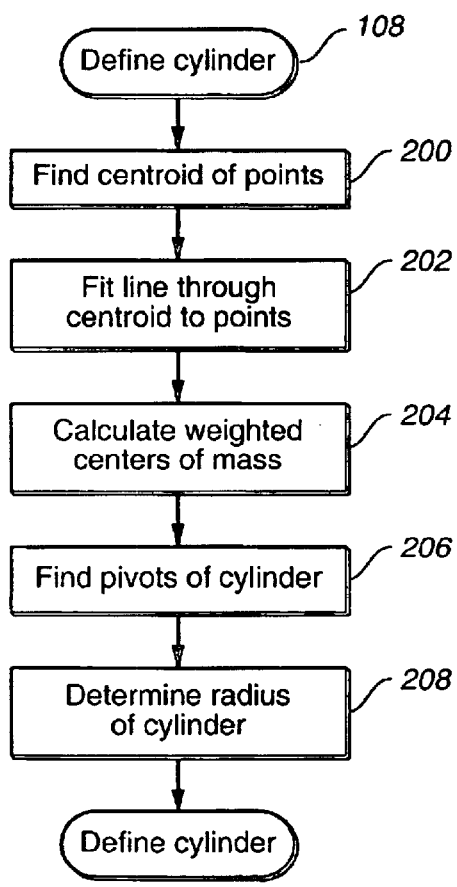
FIG._4

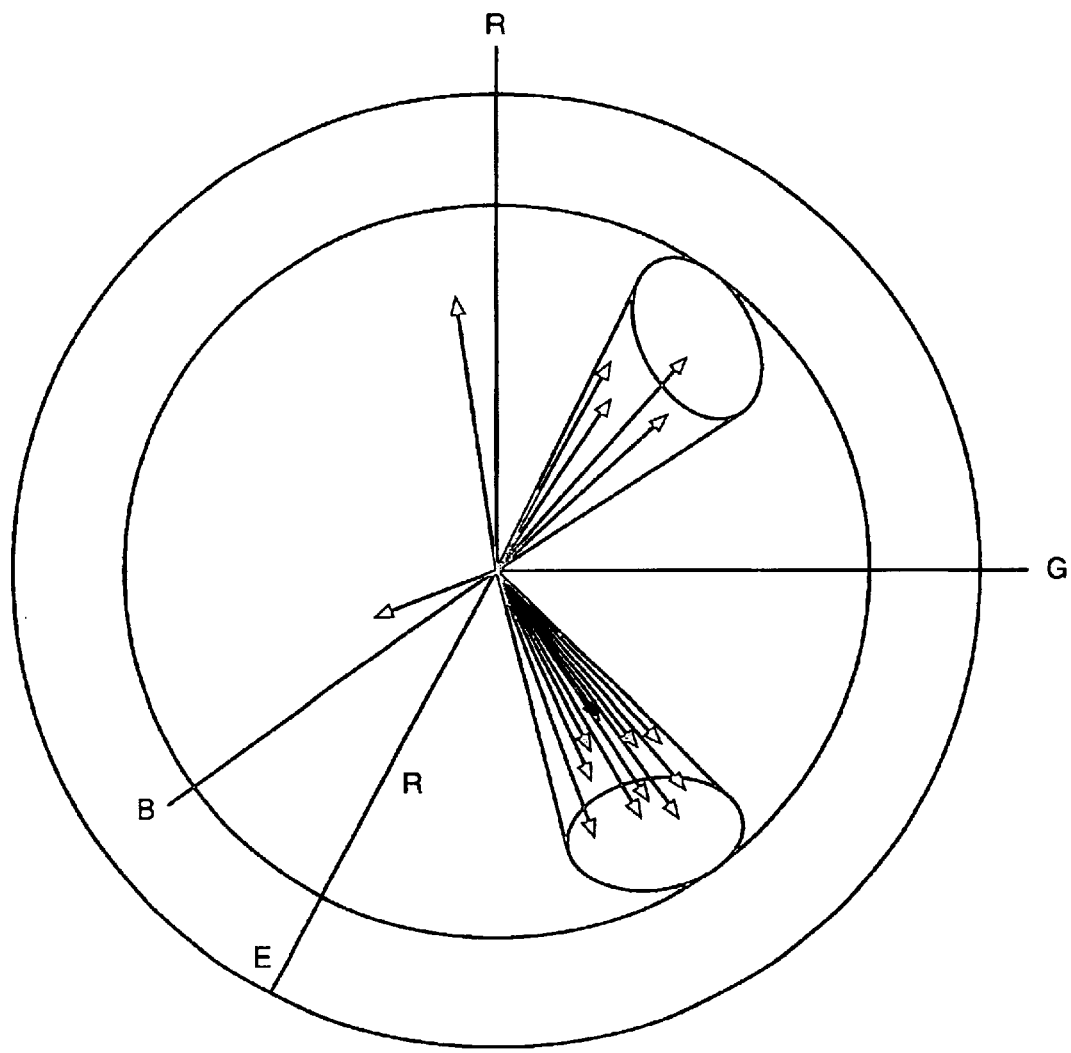
FIG._5

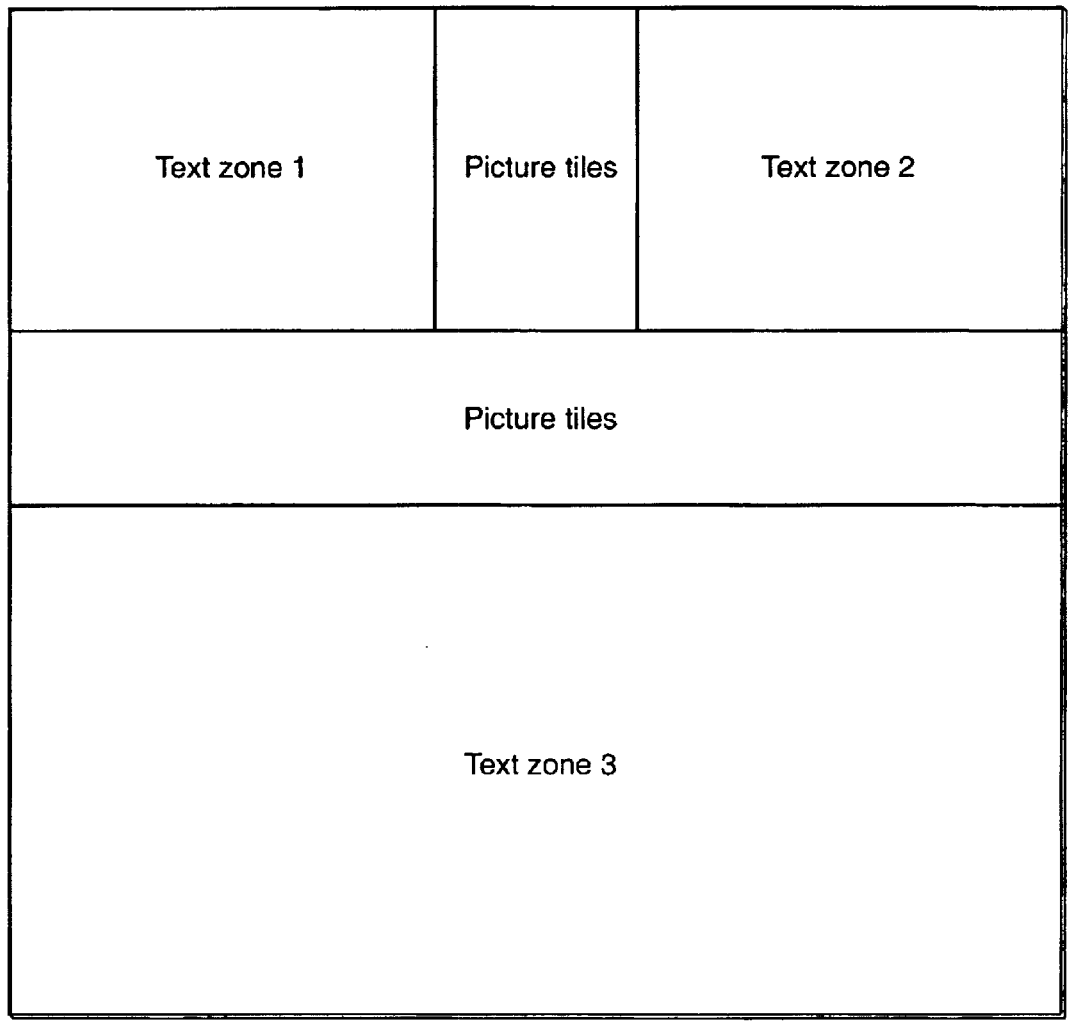
FIG._6

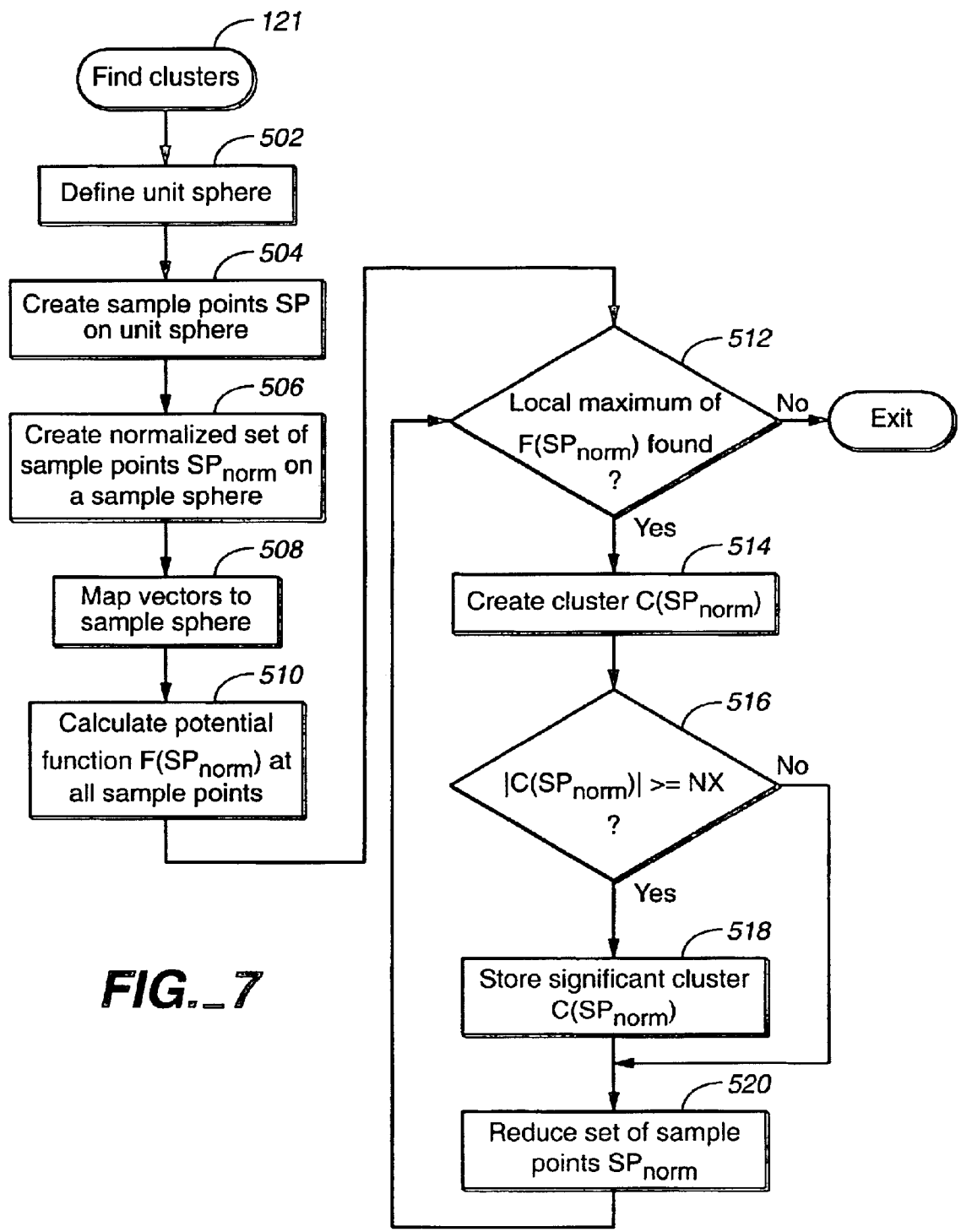
FIG._7

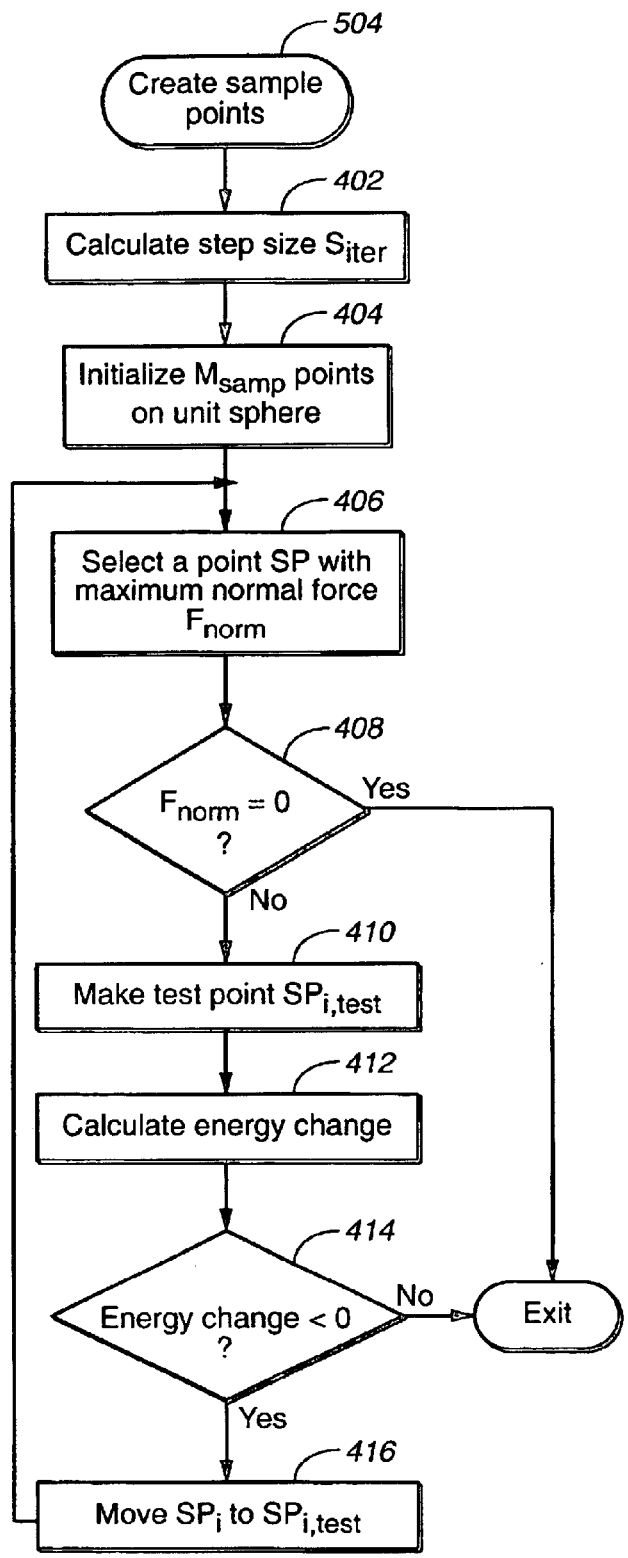
FIG._8
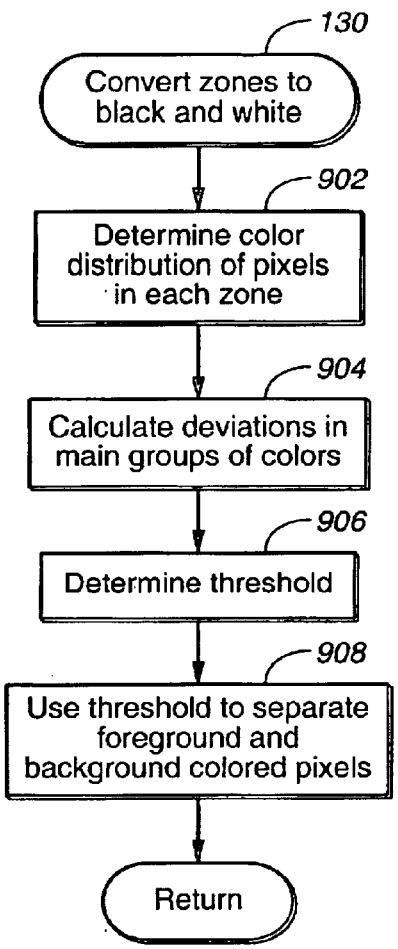
FIG._9

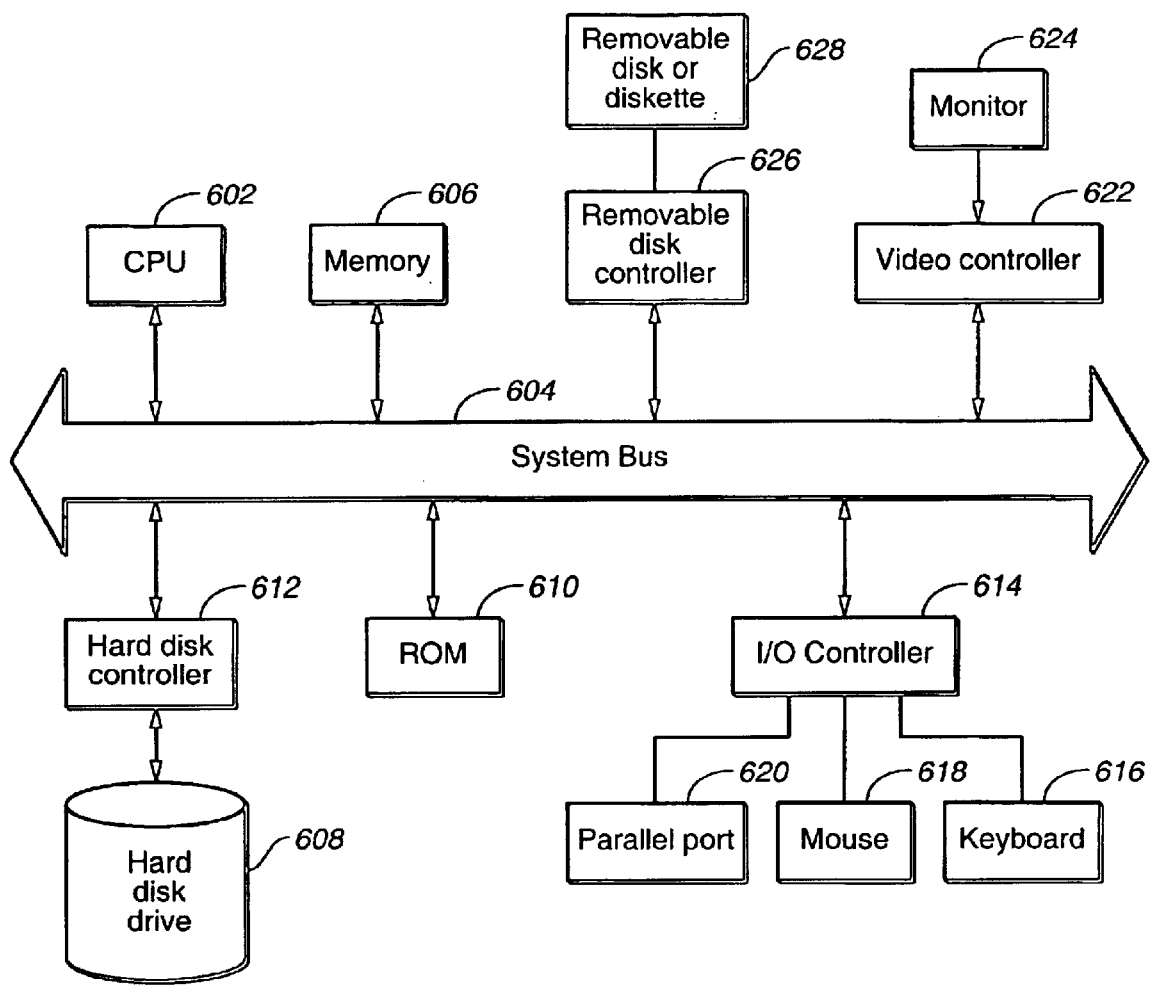
FIG._10

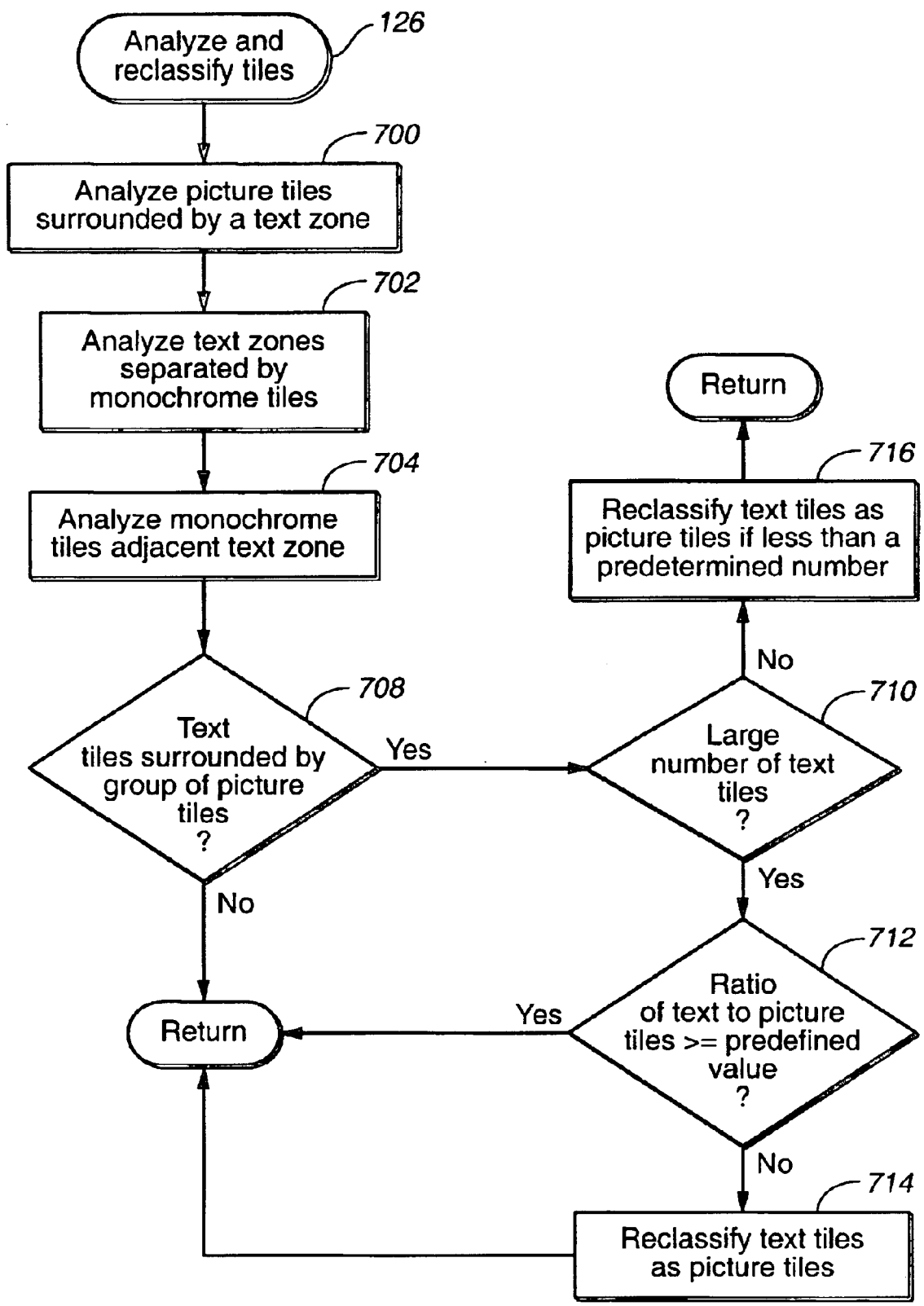
FIG._11

RECOGNIZING TEXT IN A MULTICOLOR IMAGE

The invention relates to computing systems and more particularly, to methods and apparatus for recognizing a background in a multicolor image.

Text recognition techniques, such as optical character recognition (OCR), can identify text characters or objects in an image (the "original image") stored as a pixelmap in a computer and convert the text into corresponding ASCII characters. An OCR program can differentiate between text objects and non-text objects (such as the background) in an image based on intensity differences between the text objects and the background. This can be accomplished when the text characters and the background are two distinct colors.

However, the task of recognizing text in a multicolor image is more difficult. For example, an image may include text characters, background, and non-text characters, such as graphical objects, having different colors. Furthermore, different blocks of text in the image may have different combinations of colors. For example, one text block may have red text against a white background and another text block may have yellow text against a black background.

In addition to text recognition problems, multicolor images present an additional problem when attempting to reproduce the original image. Conventional OCR programs extract text from a pixelmap and the remaining information is typically represented as a colored rectangle. Thus, a cyan page with black text would conventionally be reproduced as a cyan rectangle with black text rendered on top of the rectangle. The reason for this is the extraction of the text may result in a text alignment for the rendered text that does not exactly align with the original pixelmap. As such, to ensure no gaps are produced in the final rendered image, the reproduction of a pixelmap after OCR is typically limited to simple background rectangles. When operating on a multicolor image, conventional OCR programs typically reproduce the text over a colored rectangle without regard for gradients or patterns found in the background portion of the original image.

SUMMARY

In general, in one aspect, the invention features a method for identifying and reproducing a background of a pixelmap that includes dividing the pixelmap into a grid of tiles, determining for each tile a background component and building a representation of a background in the pixelmap using the determined background component for each tile.

Aspects of the invention can include one or more of the following advantages. The step of determining a background component can include comparing the derived background component for a tile to the background component determined for one or more neighboring tiles, and if they do not match, adjusting the background color component for the tile. The step of adjusting the background color can include determining if the tile is a picture tile or a text tile, and adjusting the background component of the tile to match neighboring picture or text tiles, respectively. The step of building a representation can include building a low resolution pixelmap for the background in the pixelmap. The step of determining a background component can include determining a background color. The step of determining a background component can include determining one or more background colors and a function defining a color transition in a given tile. The function can define a gradient of color distributed across the tile.

The step of determining a background component can include analyzing color distributions for each of the tiles, identifying tiles having two main colors, grouping two-color tiles having similar colors into two-color zones and identifying a background component for each two-color zone. The method can further include mapping pixels in each tile to a three-dimensional color space, and defining, for each two-color tile, a cylinder that encloses the pixels. The cylinder has a height and a radius. The method can include classifying a tile as a text block if the ratio of radius to height is less than a predefined value. The building a representation of a background in the pixelmap step can build a representation for each text block using the determined background component for each tile. The predefined value can be approximately 0.35.

In another aspect, the invention provides a computer-implemented method for recognizing and reproducing a background in a multicolor image stored in a computer. The method includes dividing the image into multiple blocks, analyzing color distributions for each of the blocks, identifying blocks having two main colors, grouping two-color blocks having similar colors into two-color zones, identifying a background color for each two-color zone and building a representation of the background using the determined background color for each two-color zone.

In another aspect, the invention provides a method for processing and reproducing a multicolor image represented as a pixelmap. The method includes dividing the pixelmap into a grid of tiles, determining for each tile a background component, building a representation of a background in the pixelmap using the determined background component for each tile, classifying each tile as one of either monochrome image or text tiles, processing the text tiles with an optical character recognition process to produce recognized text and reproducing the multicolor image. Reproducing the multicolor image include rendering the representation of the background and rendering the recognized text. The step of rendering the recognized text can include overlaying the recognized text over the rendered background.

In another aspect, the invention provides a data structure for a multicolor image and includes a file including a low resolution representation of the background of the multicolor image and a file containing recognized text characters located in the multicolor image.

In another aspect, the invention provides a data structure for a multicolor image and includes a file including background portion including a low resolution representation of the background of the multicolor image and text portion containing recognized text characters located in the multicolor image.

In another aspect, the invention provides a method for creating a renderable representation of a multicolor image and includes scanning a multicolor image to produce a pixelmap, producing a low resolution representation of the background of the multicolor image from the pixelmap, recognizing text characters located in the pixelmap and storing the recognized characters as text along with the low resolution representation of the multicolor image.

In another aspect, the invention provides a method for reproducing a multicolor image and includes scanning a multicolor image to produce a pixelmap, producing a low resolution representation of the background of the multicolor image from the pixelmap, recognizing text characters located in the pixelmap, storing the recognized characters as text along with the low resolution representation of the multicolor image and reproducing the multicolor image including rendering the representation of the background and rendering the recognized text characters including overlaying the recognized text characters over the rendered background.

Among the advantages of the invention are one or more of the following. The background of a multicolor image is examined carefully and stored in a compact form for use after text recognition. Gradients and patterns in the background can be reproduced and rendered along with recognized text in support of an OCR process.

Other features and advantages of the invention will become apparent from the following description and from the claims.

BRIEF DESCRIPTION OF THE DRAWINGS

FIGS. 1a, 1b, 2a and 2b are flow diagrams of a process of recognizing text and background in a multicolor image.

FIG. 3 is a diagram illustrating points in a three-dimensional color space representing the color distribution of one of multiple tiles in an image.

FIG. 4 is a flow diagram of a process of creating a statistically significant circumscribed cylinder in the three-dimensional color space.

FIG. 5 is a diagram illustrating a sample sphere used to find significant clusters of vectors representing tiles of the image.

FIG. 6 is a diagram showing text zones identified in the image.

FIG. 7 is a flow diagram of a process of finding clusters of vectors representing the tiles of the image.

FIG. 8 is a flow diagram of a process of finding a set of uniformly distributed sample points used to determine the clusters of vectors.

FIG. 9 is a flow diagram of a process of converting two-color zones to black and white zones.

FIG. 10 is a block diagram of a computer system.

FIG. 11 is a flow diagram of a process of reclassifying tiles as necessary.

DETAILED DESCRIPTION

In a multicolor image that contains differently colored text and non-text objects, it is likely that portions of the image that contain text include primarily two colors—a background color and a text (or foreground) color. The background color may not be uniform for a colored text object, and may define a gradient or pattern. The other portions of the image either contain a larger variety of colors (such as those portions containing graphical objects) or a single color (such as in the borders of the image). To recognize the text in the image, two-color portions of the image are first identified.

Referring to FIG. 1a, a computer-implemented text and background recognition program detects text zones inside a multicolor image represented as a raster of pixels and converts the text zones into black and white zones to enable use of conventional OCR techniques. In this description, the exemplary image processed by the program is a page, e.g., a page scanned by a color scanner.

Each page is initially divided at step 10 into a grid of tiles, and the color distribution of the pixels in each tile is analyzed at step 12. Based on their color distributions, the tiles are then classified at step 14. Classifications include text, monochrome, or other tiles, such as picture tiles. Next, the background component for each tile is determined at step 16. The background component for each tile may be compared to the background component for one or more adjoining tiles and adjusted to ensure that a correct background component is identified at step 18.

A low resolution background is constructed for the image from the background component data for each tile at step 20. The low resolution background can be stored for later use when rendering the reproduced image. Tiles having the same or similar main colors are grouped into two-color text zones at step 24. Thus, for example, one text zone may have tiles in which the main colors are red and white while another zone may have yellow and blue as the main colors. The two-color text zones are processed by an OCR engine to extract text characters in step 26. The recognized text characters, picture tiles and representation of the background developed in step 20 are stored for later reproduction of the image.

After text recognition, the image can be reproduced. More specifically, the background can be reproduced by rendering the low resolution background using the data stored in step 20 (step 28). The picture tiles can be rendered directly at step 30. Finally, the recognized text can be aligned and rendered onto the background at step 32.

The process of extracting text characters (step 26 of FIG. 1a) includes numerous individual steps as is shown in FIG. 1b. First, the borders of each of the text zones are made more precise at step 50; that is, pixels adjacent a particular zone belonging to that text zone are redefined into the zone. The program next at step 52 converts pixels in the main color groups in each text zone to black and white. The black and white zones can then be supplied to a conventional OCR process for text recognition and conversion at step 54.

Referring to FIGS. 2a and 2b, the steps of the text and background recognition program are described in greater detail below. At step 102, the program first divides a page into a grid of tiles, with the tile size approximately twice an expected text point size, which can be preset at, for example, 12 point. Other values can also be used. The program may provide a user interface option to enable user selection of the expected point size.

Next, at step 104, the color distribution of the pixels in each tile is analyzed in a three-dimensional color space (such as the RGB space). By way of example, in the RGB space, any given pixel PX in the tile can have a value between zero and 255 along each of the R or red axis, G or green axis, and B or blue axis. The values of the pixel along the R, G, and B axes define the color associated with that pixel.

To reduce computation complexity, the program subdivides each tile into 8×8 cells (i.e., cells of eight pixels by eight pixels). Thus, each tile is analyzed or processed at the cell level rather than at the pixel level. To further reduce computation requirements, a modified RGB space is defined in which each of the R, G, and B axes range in value from zero to 7.

In step 104, all the cells in the tile are mapped into the three-dimensional color space to create a cloud of points, as illustrated in FIG. 3. For purposes of using the points in RGB space in the equations below, the points are represented as vectors originating at (0,0,0).

In a typical text tile, there are two main colors: the text color and the background color. Thus, for a text tile, most of the cells have values close to the value corresponding to the background color. The next largest group of cells have values close to the value corresponding to the foreground or text color. As shown in FIG. 3, a text tile has two main groups of points in RGB space, indicated as group 1 (background) and group 2 (foreground).

Next, at step 106, monochrome tiles (tiles having pixels bunched close to one particular color) are identified. Monochrome tiles are not processed further until step 114. The remaining tiles are either two-color text tiles or picture tiles. Picture tiles are tiles where the colors tend to be more dispersed.

Once all the cells of each tile have been defined in the three-dimensional color space, a certain percentage of "insignificant" cells in each tile are ignored to reduce the possibility that extraneous pixels created from errors during the scanning process would distort the text recognition process. To eliminate the insignificant cells, a circumscribing cylinder (shown as cylinder 302 in FIG. 3) is defined at step 108 in the three-dimensional color space so that all the "significant" cells are contained inside the cylinder. Thus, for example, the cylinder can be defined such that 5% of the cells in each tile are located outside the cylinder and the remaining 95% of the cells are located in the cylinder.

Referring further to FIG. 4, which describes the step 108 of defining cylinder 302, the centroid 300 of all the points in the three-dimensional space is determined at step 200. Next, a line passing through the centroid 300 that has the least deviation from all points in the RGB space of each tile is determined by the program at step 202. One method to calculate such a line is to use the least squares method. The cylinder 302 (FIG. 3) is formed using the line as the axis. Next, at step 204, the weighted centers of mass M1 and M2 of groups 1 and 2, respectively, of the points are determined. M1 and M2 are vectors, with M1 calculated as follows:

$$M1 = \frac{\sum_{i=0}^{n} (P_i \cdot d_i^m)}{\sum_{i=0}^{n} d_i^m} \quad \text{(Eq. 1)}$$

where $P_i$ represents a point (corresponding to each cell) in group 1, n is the number of points in group 1, $d_i$ is the scalar distance between $P_i$ and the centroid 300, and m is an integer selected to emphasize the more distant points. For example, m can be greater than one, such as 2, 4, or 6, as well as a fractional value.

M2 is calculated as follows:

$$M2 = \frac{\sum_{i=0}^{l} (Q_i \cdot r_i^m)}{\sum_{i=0}^{l} r_i^m} \quad \text{(Eq. 2)}$$

where $Q_i$ represents a point in group 2, l is the number of points in group 2, and $r_i$ is the scalar distance between $Q_i$ and the centroid 300.

Thus, the centers of mass are weighted in the sense that the more distant points are emphasized by selecting an appropriate value for m, as discussed above.

Next, the two ends of the cylinder (pivots) are determined at step 206. The ends of the cylinder are located in the planes (perpendicular to the cylinder axis) containing the weighted centers of mass M1 and M2. By weighting the points M1 and M2 as performed in Eqs. 1 and 2, the ends of the cylinder are defined to be farther apart from each other. Because the program uses cells each containing 64 pixels, the effective color of each cell is the average of all the pixels in that cell. Therefore, the cells tend to have colors that are closer to the centroid 300. To counter this effect, the more distant points are emphasized by selecting m greater than 1.

Next, at step 208, the radius of the cylinder is defined. The value of the radius depends on the portion of the cells (e.g., 5%, 10%) that are to be disregarded. The radius is defined such that the cylinder encloses the selected fraction of the cells (e.g., 90, 95% of the cells) in each tile.

Referring again to FIGS. 2a and 2b, at step 112, the cylinder parameters are used by the program to classify each of the remaining tiles as a two-color text tile or an picture tile. A large cylinder height indicates a wide color variation between the foreground and background. The radius of the cylinder indicates the amount of fluctuation in color within each group of pixels. As a result, the smaller the radius, the smaller the amount of fluctuation in color and thus the greater the possibility that the tile includes just text and background.

The program classifies the tile as a two-color text tile if the ratio of the cylinder radius to the cylinder height is less than a predetermined value (such as 0.35). If the ratio of the cylinder radius to the cylinder height is greater than the predetermined value, the program classifies the tile as a picture tile.

Next, the background component for each tile is determined at step 114. Tiles that are classified as monochrome are assigned a background component that is equivalent to the monochrome color associated with the given tile. Tiles that are classified as picture tiles are rendered directly in a reproduced image, and no background component is required to be determined for these type of tiles. In one implementation, a background component for a picture tile is assigned based on the background component of one or more neighboring non-picture tiles.

Finally, the background component for each two-color text tile is determined based on the color distribution of the main colors in a given two-color text tile. The color distribution of the main colors is used to determine a foreground and background component. Thereafter, the color distribution may again be used to further define a gradient or pattern in the background. The background component can be defined by a single color, a background color. Assuming that the distribution of color at the center of mass M1 (group 1 of FIG. 3) associated with the background, is very small (very few colors in the background), then the background component can be represented as a single background color. Alternatively, the background component for a two-color text tile may be defined by one or more colors and a function that defines a gradient or a pattern. More specifically, a function can be derived to describe the color distribution associated with a background. In one implementation, a gradient can be defined that creates a transition from a first color to a second color in the tile. Gradients can be linear, circular or of other geometries.

After completing step 114, the background component for each tile may be compared to the background component for one or more adjoining tiles to ensure that a correct background component is identified at step 116. For example, a particular two-color text tile may have a color distribution that makes it difficult to determine which main colors are associated with the background and the foreground (e.g., more text than background pixels in the tile). By examining adjoining tiles, the background component can be verified to ensure the proper background component is identified for a given tile.

A low resolution background is constructed for the image from the background component data for each tile at step 116. In one implementation, the low resolution background is constructed in the shape of a rectangle that covers the image to reproduced. Other shapes can be used depending on the geometry of the image being reproduced. The low resolution background is stored (step 118) for later use when rendering a reproduced image.

At step 120, a vector $V_i$ is defined in each tile. The base of the vector is the center of mass M1 for the largest group of points (FIG. 3) (generally the background points). The vector extends to the point representing the center of mass M2 for the second largest group of points in each tile (generally the foreground points).

The program at step 121 groups vectors having similar directions into clusters. The larger (explained below) clusters have a higher probability of corresponding to text tiles, and thus those tiles remain classified as such, with the remaining tiles being classified as picture tiles.

As shown in FIG. 5, significant clusters are defined as groups of vectors having at least NX (a predetermined value) vectors within any given cone having a predetermined angle $\theta_{NX}$. All other groups of vectors are considered non-significant and thus reclassified as picture tiles at step 122. A more detailed discussion of finding significant clusters of vectors is provided in connection with FIGS. 7 and 8.

Having further reduced the number of text tiles, the program at step 124 then groups, geometrically, tiles on the page that belong to the same cluster into zones. Text tiles adjacent to each other that belong to the same cluster are grouped to a corresponding zone. FIG. 6 shows a page separated into text zones and picture tiles. Each zone is characterized by two major colors corresponding to the text and background colors. In the example of FIG. 6, there are three text zones separated by picture tiles.

After the zones have been defined, the program at step 126 analyzes each of the tiles in the context of surrounding tiles to determine if any text, picture, or monochrome tiles need to be reclassified. Thus, referring further to FIG. 11, the program determines at step 700 if a zone of the same two-color tiles surround one or just a few picture tiles, it is likely that those picture tiles should be text tiles in that zone if certain conditions are met. A picture tile is considered to be "close" to the surrounding text tiles if it corresponds to a vector that is within a cone having an angle $2\theta_{NX}$ that includes the vectors representing the text tiles. If this is true, then the picture tile is reclassified as a text tile belonging to the zone.

Next, at step 702, the program determines if monochrome tiles separate two zones having the same two colors. If the monochrome tiles are of the same color as the background color of the two zones, then the two zones along with the monochrome tiles are reclassified as one two-color zone.

Similarly, at step 704, if a text zone is next to a group of monochrome tiles, and the background color of the text zone is the same as the color of the monochrome tiles, then the monochrome tiles are reclassified as text tiles and included into the text zone.

Next, at step 708, the program determines if text tiles are surrounded (referred to as "surrounded text tiles") by picture tiles. If so, the program determines at step 710 if a large number of text tiles exists elsewhere in the image. If such number of text tiles exceeds half the total number of tiles in the page, then the program at step 712 determines if the ratio of the surrounded text tiles to the picture tiles is at least a threshold value, e.g., 25%. If so, the surrounded text tiles are considered significant and remain classified as text tiles. Otherwise, if the ratio is less than 25%, the surrounded text tiles are reclassified at step 714 as picture tiles.

If the number of text tiles outside the picture tiles is less than half the total number of tiles in the page, then the program checks at step 716 the number of surrounded text tiles. If the number is less than a predetermined value, e.g., 5, the program reclassifies the surrounded text tiles as picture tiles; otherwise, the surrounded text tiles remain classified as text tiles.

Referring again to FIG. 2b, after the text zones have been classified, the borders of each of the two-color zones are made more precise at step 128 by including or excluding cells from adjacent picture tiles depending on their colors. Potentially, the tiles located at the edge of a text zone may contain incomplete text characters belonging to the text zone; that is, part of a text character is located in the adjacent picture tile. Thus, if the adjacent picture tile contains colors that are the same as the two colors in the text zone, then it is highly likely that those cells in the picture tile belong to the tile in the text zone. Accordingly, those cells from the adjacent picture tiles are redefined as being part of the text zone. Further, cells in the border tiles that do not belong to the zone are excluded, such as the "insignificant" cells not contained in the cylinder 32 of FIG. 3.

Next, at step 130, the foreground and background colors in each color zone are converted into black and white, respectively, to create black and white text zones. Once converted, the text zones, having known positions in the page, can be processed using conventional OCR techniques to capture text from the page.

Referring to FIG. 9, this black and white conversion process is described in more detail. First, at step 902, the color distribution of pixels (rather than the 8×8 cells used in previous steps) is determined for each text zone by mapping the pixels to the three-dimensional color (e.g., RGB) space, in which each of the axes range from 0–255. The analysis now needs to be performed at the pixel level to ensure that the individual pixels are properly grouped as background or foreground color pixels.

A simple technique to divide the pixels into one of the two groups is to use a dividing plane drawn in the middle between the two large groups of pixels. However, the distribution of pixels may not be so neatly clumped into two distinct groups, as there may be a significant number of pixels located between the two main groups of color. This may result from poor scanning of the page. Consequently, using a dividing plane in the middle to define background and foreground pixels may not produce accurate results as foreground pixels may be incorrectly marked as background pixels, and vice versa.

A better technique is to define a threshold plane that is perpendicular to a line between center points A and B of the background and foreground pixels to identify the foreground and background pixels in a particular zone.

The process described in connection with FIG. 2a to identify the weighted centers of mass is applied at the pixel level (rather than the cell level) to determine center point A and B (which are vectors in the RGB space) for the background and foreground groups of pixels, respectively, in each zone. The intersection point of the threshold plane to the line AB is proportional to the deviation of the pixels between the background and foreground colors, with the deviation calculated at step 904.

The objective is to define a threshold point T, representing the intersection of the threshold plane to line AB. Pixels $PX_i$ falling on one side of the threshold plane containing the threshold point T are in set $S_A(T)$ (background) and those on the other side are in set $S_B(T)$ (foreground). The two sets of pixels, $S_A(T)$ and $S_B(T)$, are defined mathematically as follows:

$$PX_i \in S_A(T), \text{ if}(PX_i-T)\cdot(A-T)>0, \quad \text{(Eq. 3)}$$

$$PX_i \in S_B(T), \text{ otherwise} \quad \text{(Eq. 4)}$$

where $PX_i$ is in set $S_A(T)$ if the dot product of $(PX_i-T)$ and $(A-T)$ is greater than zero; that is, $PX_i$ projects to between points A and T on line AB.

To derive the final value of the threshold T, an iterative process is used in which an initial threshold point $T_0$ is first defined in the center between points A and B on line AB:

$$T_0 = \frac{A+B}{2}. \quad \text{(Eq. 5)}$$

All pixels between A and $T_0$ are initially defined as the background pixels (referred to as "the suggested background pixels"), and all pixels between $T_0$ and B are initially defined as the foreground pixels (referred to as "the suggested foreground pixels").

The average deviation $d_A$ is then calculated for the suggested background pixels;

$$d_A = \frac{\sum_{i=1}^{K} dist(PX_i, A)}{K} \quad \text{(Eq. 6)}$$

where K is the total number of suggested background pixels, and $dist(PX_i,A)$ is the distance between a point $PX_i \in S_A(T_0)$ and A.

The average deviation $d_B$ is calculated the same way for the suggested foreground pixels.

Once $d_A$ and $d_B$ are calculated, a new threshold point $T_1$ is calculated by dividing the line AB in proportion to $d_A/d_B$:

$$T_1 = A + d_A/d_B*(A+B). \quad \text{(Eq. 7)}$$

However, to avoid having the threshold point $T_1$ be too close to either point A or B, a ratio limit $r_0$ can be set (e.g., at 0.25). Thus, if $d_A/d_B < r_0$, then $$T_1 = A + r_0*(A+B). \quad \text{(Eq. 8)}$$

If $d_B/d_A < r_0$, then $$T_1 = A + (1-r_0)*(A+B). \quad \text{(Eq. 9)}$$

The threshold $T_1$ is used to divide the foreground and background pixels at step 908, and after the foreground and background pixels have been defined in each zone, they are converted to black and white pixels (black for foreground and white for background). If greater accuracy is desired, then more iterations of the process described above can be performed to calculate $T_2$, $T_3$, and so on.

Referring to FIGS. 7 and 8, the step of grouping vectors into clusters (step 121 in FIG. 2b) is described in greater detail.

In FIG. 7, at step 502, a unit radius sphere (see FIG. 5) is first created in the three-dimensional color space (e.g., RGB space) on which sample points SP are defined at step 504. As described further below, these sample points are used to calculate a potential function to determine where the vectors $V_i$ representing each text tile are clustered.

The sample points can be defined to be uniformly distributed on the sphere (using an electrostatic model, as described further in connection with FIG. 8). One advantage of using properly spaced, uniformly distributed sample points is that it is less likely that local maxima of the potential function are missed. Alternatively, the sample points can be located on circular paths (spaced a predetermined angle apart) along the surface of the sphere.

Once a uniform set of sample points $SP=\{Sp_j\}(j=1 \ldots M_{samp})$ have been defined on the unit radius sphere, a normalized set of sample points $SP_{norm}$ is then defined at step 504, which are located on a "sample sphere" having a radius $(R+\in)$. The parameter R is the radius of the original sphere (which has been defined as having a radius of 1), and $\in$ is a parameter selected to prevent distortions in calculating the potential function F when the vectors $V_i(I=1 \ldots N)$ are located close to a sample point. The values for $\in$ can range, for example, between $0.1*R$ and $0.2*R$.

It is noted that the sample points SP and $SP_{NORM}$ can be calculated once and stored. The stored sample points can then be repeatedly used to avoid recalculating the sample points for each image processed.

Next, at step 508, the program maps the vectors corresponding to the identified two-color tiles into the sphere in RGB space, as shown in FIG. 5. Each of the vectors projects from the center of the sphere, which also coincides with vertex (0,0,0). To identify the clusters of vectors, the following potential function is first evaluated at step 510 at each of normalized sample points $SP_{norm}$ on the sample sphere:

$$F(SP_{norm}) = \sum_{i=1}^{N} \frac{|V_i|}{dist(SP_{norm}, V_i)^m}, \quad \text{(Eq. 10)}$$

where $dist(s,t_i)$ refers to the distance between sample point $SP_{norm}$ and $V_i$, m is a clustering parameter, which can be selected between values 2 and 3, for example, to make the potential function F more "sensitive" at sample points to allow the potential function to better discriminate between close and remote vectors $V_i$. The potential function F has larger values at sample points that are closer to vector points $V_i$.

Next, at step 512, the program determines if a local maximum of $F(SP_{norm})$ exists inside cluster cones. A sample point $SP_{norm}$ is a local maximum point if $F(SP_{norm}) \geq F(SP_{norm(1)})$, for all sample points $SP_{norm(1)}$ that are inside the cone having a predetermined angle $\theta_{clus}$ and axis $SP_{norm}$; that is, the angle between $SP_{norm}$ and $SP_{norm(1)}$ is less than $\theta_{clus}$:

$$(SP_{norm} \cdot SP_{norm(i)})/(|SP_{norm}|*|SP_{norm(i)}|) \leq \cos \theta_{clus} \quad \text{(Eq. 11)}$$

If found, the program then at step 514 defines a cluster $C(SP_{norm})$, which contains the set of vectors $V_i$ that fall inside the cone having angle $\theta_{clus}$ and axis $SP_{norm}$.

At step 516, it is determined if the cluster $C(SP_{norm})$ contains a predetermined minimum number NX of vectors. If the number of vectors exceeds or equals NX, then the cluster $C(SP_{norm})$ is marked as "significant" and stored at step 518. Otherwise, the cluster is marked as insignificant. Next, the program at step 520 excludes all sample points $SP_{norm(1)}$ and vectors $V_i$ falling within the considered cone from further processing. The program then proceeds to step 512 to find the next local maximum of the potential function F. This process is repeated until no more local maxima of the potential function are found since all sample points have been considered.

Tiles that correspond to the identified significant clusters are marked as text tiles, whereas tiles corresponding to the non-significant clusters are marked as picture tiles.

Referring to FIG. 8, the step of creating a set of uniformly distributed sample points SP (step 504 in FIG. 7) on the unit sphere is described.

The algorithm described uses an electrostatic model—if $M_{samp}$ similar electrical charges are allowed to slide on a spherical surface, they will spread uniformly over the surface so that the total energy of the system is minimal.

First, at step 402, a step size $s_{iter}$ is defined as follows:

$$s_{iter} = \arcsin(\theta_0), \quad \text{(Eq. 12)}$$

where $\theta_0$ is the precision angle tolerance. For example, $\theta_0$ can be set at 1°, in which case the sample point spherical coordinates are defined in 1° increments along any direction. The step size $s_{iter}$ determines the amount of movement of the sample points for each iteration of the sample point determination process.

Next, at step 404, $M_{samp}$ sample points $\{SP_1, SP_2, \ldots SP_{Msamp}\}$, where $$SP_i = (\rho_i, \phi_i, \theta_i), \quad \text{(Eq. 13)}$$

are initially defined in the unit sphere. $\rho_i, \phi_i,$ and $\theta_i$ are the spherical coordinates, with $\rho_i = 1$ for a unit sphere. $M_{samp}$ (the number of sample points) is determined by a parameter $\alpha$, which is the maximum allowed angular distance along the $\theta$ axis between any two sample points.

$$M_{samp} = [180/\alpha] * [360/\alpha]. \quad \text{(Eq. 14)}$$

The sample points can be initially randomly positioned in the sphere under the condition that all sample points are different and do not belong to the same plane. Alternatively, they can be initialized as points with spherical coordinates ($\rho=1$, $\phi=j*\alpha$, $\theta=k*\alpha$), $j=1, \ldots [180/\alpha]$, and $k=1, \ldots, [360/\alpha]$.

The goal to be achieved is to find the distribution of sample points that provides the least amount of energy. Thus, at step 406, a point $SP_i$ is selected that has the maximum normal force $G_{norm}$ (normal to the vector $SP_i$).

$$G_{norm} = G_{total} - SP_i * |G_{total}| * \cos\beta, \quad \text{(Eq. 15)}$$

where $$G_{total} = \sum_{\substack{j=1 \\ j \neq i}}^{N} (SP_i - SP_j)/|SP_i - SP_j|^3, \quad \text{(Eq. 16)}$$

and $\beta$ is the angle between vectors $SP_i$ and $G_{total}$.

At step 408, the program determines if $G_{norm}$ is equal to zero. If so, then no more energy reduction is necessary and the program exits. However, if $G_{norm}$ has a non-zero value, the program at step 410 creates a test point $SP_{i,test}$:

$$SP_{i,test} = SP_i + s_{iter} * G_{norm}/|G_{norm}|. \quad \text{(Eq. 17)}$$

The test point is essentially the point $SP_i$ moved by a step $s_{iter}$ in the direction of $G_{norm}$.

Next, at step 412, the energy change $\Delta E_i$ between $SP_i$ and $SP_{i,test}$ is calculated as follows:

$$\Delta E_i = \sum_{\substack{j=1 \\ j \neq i}}^{N} (1/r_{j,test} - 1/r_{j,i}), \quad \text{(Eq. 18)}$$

where $r_{j,i}$ is the distance between $SP_j$ and $SP_i$, and $r_{j,test}$ is the distance between $SP_j$ and $SP_{i,test}$.

The program then determines at step 414 if the energy change $\Delta E_i$ is less than zero. If not, then that indicates moving $SP_{i,test}$ would either increase the energy or the energy would remain the same. In that case, the program exits as no more energy reduction is possible.

If however, an energy reduction has been achieved (i.e., $\Delta E_i < 0$), then $SP_i$ is moved to $SP_{i,test}$ $$SP_i = SP_{i,test}. \quad \text{(Eq. 19)}$$

From step 416, the program returns to step 406 and the process is repeated until either $G_{norm} = 0$ or no more energy reduction can be achieved.

Referring now to FIG. 10, the text and background recognition program may be implemented in digital electronic circuitry or in computer hardware, firmware, software, or in combinations of them, such as in a computer system. The computer includes a central processing unit (CPU) 602 connected to an internal system bus 604. The storage media in the computer system include a main memory 606 (which can be implemented with dynamic random access memory devices), a hard disk drive 608 for mass storage, and a read-only memory (ROM) 610. The main memory 606 and ROM 610 are connected to the bus 604, and the hard disk drive 608 is coupled to the bus 604 through a hard disk drive controller 612.

Apparatus of the invention maybe implemented in a computer program product tangibly embodied in a machine-readable storage device (such as the hard disk drive 608, main memory 606, or ROM 610) for execution by the CPU 602. Suitable processors include, by way of example, both general and special purpose microprocessors. Generally, a processor will receive instructions and data from the read-only memory 610 and/or the main memory 606. Storage devices suitable for tangibly embodying computer programming instructions include all forms of non-volatile memory, including by way of example semiconductor memory devices, such as EPROM, EEPROM, and flash memory devices; magnetic disks 528 connected through a controller 626 such as the internal hard disk drive 608 and removable disks and diskettes; magneto-optical disks; and CD-ROM disks. Any of the foregoing may be supplemented by, or incorporated in specially-designed ASICs (application-specific integrated circuits).

The computer system further includes an input-output (I/O) controller 614 connected to the bus 604 and which provides a keyboard interface 616 for connection to an external keyboard, a mouse interface 618 for connection to an external mouse or other pointer device, and a parallel port interface 620 for connection to a printer. In addition, the bus 604 is connected to a video controller 622 which couples to an external computer monitor or a display 624. Data associated with an image for display on a computer monitor 624. Data associated with an image for display on a computer monitor 624 are provided over the system bus 604 by application programs to the video controller 622 through the operating system and the appropriate device driver.

Other embodiments are also within the scope of the following claims. For example, the order of steps of the invention: may be changed by those skilled in the art and still achieve desirable results. The various thresholds and parameters can be modified. Different methods of representing the color distribution of each of the tiles (other than using vectors) in the multicolor page can be used.

What is claimed is:

1. A method for identifying and reproducing a background of a pixelmap, comprising:
   dividing a pixelmap into a grid of tiles;
   determining for each tile a background component, including comparing the determined background component for a tile to the background component determined for one or more neighboring tiles not including the tile,
      if the determined background component for the tile does not match the background component determined for one or more of the one or more neighboring tiles, adjusting the background component for the tile to match the background component determined for one of the one or more neighboring tiles;
   building a low resolution pixelmap representing a background of the pixelmap using the determined background component for each tile; and
   storing the low resolution pixelmap.

2. The method of claim 1, wherein the step of adjusting the background component for the tile includes determining if the tile is a text file and, if so, adjusting the background component for the tile to match the background component for other neighboring text tiles.

3. The method of claim 1, wherein the step of adjusting the background color component for the tile includes determining if the tile is a picture tile and, if so, adjusting the background component for the picture tile to match the background component for other neighboring non-picture tiles.

4. The method of claim 1, wherein the step of building a low resolution pixelmap includes building a low resolution color pixelmap representing the background of the pixelmap.

5. The method of claim 1, wherein the step of determining a background component includes determining a background color.

6. The method of claim 1, wherein the step of determining a background component includes determining one or more background colors and a function defining a color transition in a given tile.

7. The method of claim 6, wherein the function defines a gradient of color distributed across the tile.

8. The method of claim 1, wherein the step of determining a background component includes:
   analyzing color distributions for each of the tiles;
   identifying tiles having two main colors;
   grouping two-color tiles having similar colors into two-color zones; and
   identifying a background component for each two-color zone.

9. The method of claim 8, further comprising
   mapping pixels in each tile to a three-dimensional color space;
   defining, for each two-color tile, a cylinder that encloses the pixels, the cylinder having a height and a radius; and
   classifying a tile as a text block if the ratio of radius to height is less than a predefined value, wherein the building a low resolution pixelmap step builds a low resolution pixelmap for each text block using the determined background component for each tile.

10. The method of claim 9, where the predefined value is approximately 0.35.

11. A computer-implemented method for recognizing and reproducing a background in a multicolor image stored in a computer, the method comprising:
   dividing an image into multiple blocks;
   analyzing color distributions for each of the blocks;
   identifying blocks having two main colors;
   grouping two-color blocks having similar colors into two-color zones;
   determining a background color for each two-color zone, including comparing the determined background component for a tile to the background component determined for one or more neighboring tiles not including the tile,
      if the determined background component for the tile does not match the background component determined for one or more of the one or more neighboring tiles, adjusting the background component for the tile to match the background component determined for one or the one or more neighboring tiles; and
   building a low resolution pixelmap representing the background of the multicolor image using the determined background component for each two-color zone.

12. A computer-implemented method for processing and reproducing a multicolor image represented as a pixelmap, the method comprising:
   dividing a pixelmap into a grid of tiles;
   classifying each tile as one of either monochrome, picture, or text tiles;
   assigning a background component to each monochrome tile that is equivalent to a monochrome color associated with a given monochrome tile;
   determining for each text tile a background component;
   building a low resolution pixelmap representing a background of the pixelmap using the determined background component for each text tile and the assigned background component for each monochrome tile;
   processing the text tiles with an optical character recognition process to produce recognized text; and
   reproducing the multicolor image including
      rendering directly each picture tile;
      rendering the low resolution pixelmap, and
      rendering the recognized text.

13. The method of claim 12, where the step of rendering the recognized text includes overlaying the recognized text over the rendered low resolution pixelmap.

14. A computer program product, tangibly stored on a computer-readable medium, for identifying and reproducing a background of a pixelmap, the product comprising instructions operable to cause a programmable processor to:
   divide a pixelmap into a grid of tiles;
   determine for each tile a background component, including compare the determined background component for a tile to the background component determined for one or more neighboring tiles not including the tile,
      if the determined background component for the tile does not match the background component determined for one or more of the one or more neighboring tiles, adjust the background component for the tile to match the background component determined for one of the one or more neighboring tiles;
   build a low resolution pixelmap representing a background of the pixelmap using the determined background component for each tile; and
   store the low resolution pixelmap.

15. The product of claim 14, wherein the instructions to adjust the background component for the tile include instructions operable to cause a programmable processor to determine if the tile is a text file and, if so, adjust the background component for the tile to match the background component of other neighboring text tiles.

16. The product of claim 14, wherein the instructions to adjust the background color component for the tile include instructions operable to cause a programmable processor to determine if the tile is a picture tile and, if so, adjusting the background component for the picture tile to match the background component for other neighboring non-picture tiles.

17. The product of claim 14, wherein the instructions to build a low resolution pixelmap include instructions operable to cause a programmable processor to build a low resolution color pixelmap representing the background of the pixelmap.

18. The product of claim 14, wherein the instructions to determine a background component include instructions operable to cause a programmable processor to determine a background color.

19. The product of claim 14, wherein the instructions to determine a background component include instructions operable to cause a programmable processor to determine one or more background colors and a function defining a color transition in a given tile.

20. The product of claim 19, wherein the function defines a gradient of color distributed across the tile.

21. The product of claim 14, wherein the instructions to determine a background component include instructions operable to cause a programmable processor to:

analyze color distributions for each of the tiles;

identify tiles having two main colors;

group two-color tiles having similar colors into two-color zones; and identify a background component for each two-color zone.

22. The product of claim 21, further comprising instructions operable to cause a programmable processor to:

map pixels in each tile to a three-dimensional color space;

define, for each two-color tile, a cylinder that encloses the pixels, the cylinder having a height and a radius; and classify a tile as a text block if the ratio of radius to height is less than a predefined value, wherein the instructions to build low resolution pixelmap include instruction operable to cause a programmable processor to build a low resolution pixelmap for each text block using the determined background component for each tile.

23. The product of claim 22, where the predefined value is approximately 0.35.

* * * * *